United States Patent
Pyun et al.

(10) Patent No.: US 12,257,566 B2
(45) Date of Patent: Mar. 25, 2025

(54) CARBON DIOXIDE ABSORBENT INCLUDING PHENOLATE-BASED IONIC LIQUID AND ALIPHATIC ALCOHOL AND METHOD OF SEPARATING CARBON DIOXIDE USING THE SAME

(71) Applicant: SK Innovation Co., Ltd., Seoul (KR)

(72) Inventors: Lim Ok Pyun, Daejeon (KR); Ilgu Jung, Daejeon (KR); Byul Ha Na Min, Daejeon (KR); Junga Lee, Daejeon (KR); Jisu Jeong, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 18/257,524

(22) PCT Filed: Jan. 10, 2023

(86) PCT No.: PCT/KR2023/000440
§ 371 (c)(1),
(2) Date: Jun. 14, 2023

(87) PCT Pub. No.: WO2023/140553
PCT Pub. Date: Jul. 27, 2023

(65) Prior Publication Data
US 2025/0001390 A1    Jan. 2, 2025

(30) Foreign Application Priority Data

Jan. 24, 2022   (KR) .................. 10-2022-0009893
Jan. 9, 2023    (KR) .................. 10-2023-0002827

(51) Int. Cl.
*B01J 20/22*     (2006.01)
*B01D 53/14*     (2006.01)
*B01J 20/34*     (2006.01)

(52) U.S. Cl.
CPC .......... *B01J 20/22* (2013.01); *B01D 53/1475* (2013.01); *B01J 20/3483* (2013.01); *B01D 2252/202* (2013.01); *B01D 2252/204* (2013.01); *B01D 2252/30* (2013.01); *B01D 2257/504* (2013.01)

(58) Field of Classification Search
CPC ... B01J 20/22; B01J 20/3483; B01D 53/1475; B01D 2252/202; B01D 2252/204; B01D 2252/30; B01D 2257/504
USPC .......................................................... 502/401
See application file for complete search history.

(56) References Cited

U.S. PATENT DOCUMENTS

2002/0189444 A1   12/2002   Brennecke et al.

FOREIGN PATENT DOCUMENTS

| CN | 102126968 A | 7/2011 |
| CN | 103432868 A | 12/2013 |
| KR | 1020110099466 A | 9/2011 |
| KR | 1020120055393 A | 5/2012 |
| KR | 1020130136617 A | 12/2013 |

OTHER PUBLICATIONS

Li et al., "Choline-base ionic liquids for CO2 capture and conversion", Sci China Chem, Feb. 2019, vol. 62, No. 2, pp. 256-261. (Year: 2019).*
Sung et al., "Solubility of Carbon Dioxide in Strongly Basic Ionic Liquid", Bull. Korean Chem. Soc., 2010, pp. 2797-2800, vol. 31:10.
Vafaeezadeh et al., "A novel phenolic ionic liquid for 1.5 molar CO2 capture: combined experimental and DFT studies", RSC Adv., 2015, pp. 58005-58009, vol. 5.

* cited by examiner

*Primary Examiner* — Anita Nassiri-Motlagh
(74) *Attorney, Agent, or Firm* — The Webb Law Firm

(57) ABSTRACT

Provided are a carbon dioxide absorbent including an ionic liquid including a choline-based cation and a phenolate-based anion, and an aliphatic alcohol, and a method of separating carbon dioxide using the same. Since the carbon dioxide absorbent of the present disclosure is thermally and chemically stable, it may decrease by-products released into the atmosphere and thus, is environmentally friendly. The method of separating carbon dioxide using the absorbent is an economical method which allows energy saving with low renewable energy.

20 Claims, No Drawings

CARBON DIOXIDE ABSORBENT INCLUDING PHENOLATE-BASED IONIC LIQUID AND ALIPHATIC ALCOHOL AND METHOD OF SEPARATING CARBON DIOXIDE USING THE SAME

CROSS REFERENCE TO RELATED APPLICATIONS

This application is the United States national phase of International Patent Application No. PCT/KR2023/000440 filed Jan. 10, 2023, and claims priority to Korean Patent Application No. 10-2022-0009893 filed Jan. 24, 2022 and Korean Patent Application No. 10-2023-0002827 filed Jan. 9, 2023, the disclosures of each of which are hereby incorporated by reference in their entireties.

BACKGROUND OF THE INVENTION

Field of the Invention

The present disclosure relates to a carbon dioxide absorbent comprising: an ionic liquid comprising a choline-based cation and a phenolate-based anion, and an aliphatic alcohol.

Also, the present disclosure relates to a method of separating carbon dioxide using the carbon dioxide absorbent.

Description of Related Art

Due to the rapid progress of economic development and industrialization throughout the world, the amount of fossil fuel used which is the main source of energy has also continuously increased. In particular, it is known that carbon dioxide ($CO_2$) accounts for the largest proportion of the major greenhouse gases formed in the process of burning fossil fuel for conversion into energy, and is closely related to the problem of global warming. The global warming problem has intensified due to the increased and prolonged energy use and is receiving worldwide attention, and in order to solve the problem, the research fields related to carbon dioxide become important.

In the method of separating carbon dioxide from exhaust gas from chemical plants, power plants, or large boilers and natural gas, methods such as an absorption method, an adsorption method, a separation membrane method, and a cryogenic separation are used. In particular, when the concentration of carbon dioxide emitted is low, an absorption method or an adsorption method is often used. Since the absorption method or the adsorption method may selectively separate only some gases which are absorbed or adsorbed well, it is industrially often used, but since an absorbent and an adsorbent are chemically modified during a separation process, they need to be replaced periodically.

When a solid adsorbent is used, the adsorbent is less chemically modified, and thus, it is advantageous to apply the solid adsorbent when it has a long replacement cycle; however, since the absorption method uses a liquid absorbent, it is easy to replace the absorbent, and thus, the absorption method is widely used in purification of a large amount of exhaust gas or gas separation, but the absorbent is chemically modified.

As the carbon dioxide absorbent, an aqueous solution of amines such as monoethanolamine (MEA), N-methyl diethanolamine (NDEA), and diethanolamine (DEA) is most widely used, because an amine absorbent which is weakly alkaline forms a chemical bond with carbon dioxide which is an acidic gas and when heat is applied, the bond is broken, carbon dioxide is degassed and recovered, and the absorbent may be regenerated.

However, the process using the aqueous solution of amines has several serious problems. In particular, MEA belonging to primary amines, which is used as a 30 wt % aqueous solution, has a disadvantage of requiring high renewable energy in a desorption process after absorbing carbon dioxide due to a high heat capacity (4.2 KJ/kg. K) of water, and has problems such as irreversible decomposition of amine by a high temperature used for breaking a chemical bond between carbon dioxide and an absorbent in a regeneration step of an amine absorbent, decomposition of amine by impurities such as $SO_x$ and $NO_x$ included in absorption gas, performance deterioration of an absorbent and supplement of an absorbent by the irreversible decomposition of amine, corrosion of an absorption device by amine itself or decomposition product, and contamination of gaseous carbon dioxide regenerated by the vapor pressure of an absorbent, which are pointed out as disadvantages.

As an alternative thereto, an ionic liquid has been suggested. An ionic liquid is composed of a cation having a large organic symmetric structure such as quaternary ammonium, imidazolium, pyridinium, and phosphonium ions, and an anion composed of an inorganic material such as $[Cl]^-$, $[Br]^-$, $[I]^-$, $[BF_4]^-$, $[PF_6]^-$, $[Tf_2N]^-$ with a small size having a relatively asymmetric structure, an organic material such as $[RCO_2]^-$, or the like. Due to the characteristics of the ionic liquid which may be converted to have various properties by infinite combinations such as a cation with an anion, a functional group, and the like, it is also referred to as a "designer solvent".

Many studies on an ionic liquid based on an imidazolium cation and a $[Cl]^-$, $[BF_4]^-$, $[PF_6]^-$, $[CH_3SO_3]^-$, $[CF_3BF_3]^-$, or $[C_2F_5BF_3]^-$ anion and the synthesis using it have been conducted, and an ionic liquid containing fluorine may be expected to have high $CO_2$ absorptive capacity, but is difficult to biodegrade, and thus, is environmentally harmful and fluorinated anions are very expensive.

Therefore, it is necessary to develop an absorbent which is a liquid material having optimal properties for separating carbon dioxide, is thermally stable so that there is no possibility of atmospheric release, is chemically stable to decrease atmospheric release of decomposition products, and may desorb carbon dioxide with low renewable energy.

SUMMARY OF THE INVENTION

Technical Problem

An object of the present invention is to provide an economical carbon dioxide absorbent which is thermally and chemically stable so that it may decrease atmospheric release of decomposition products when applied to a process, and may desorb carbon dioxide with low renewable energy.

Another object of the present invention is to provide a carbon dioxide absorbent which has no solid production after absorbing carbon dioxide, does not cause obstruction of piping by controlling a viscosity increase, and has excellent process ease.

Still another object of the present invention is to provide a method of separating carbon dioxide environmentally friendly and economically using the carbon dioxide absorbent.

Another object of the present disclosure is to provide a method of capturing carbon dioxide.

Another object of the present disclosure is to provide a method of reducing greenhouse gas emissions.

Technical Solution

In one general aspect, a carbon dioxide absorbent comprises: an ionic liquid comprising a choline-based cation and a phenolate-based anion; and an aliphatic alcohol.

The carbon dioxide absorbent according to an exemplary embodiment of the present disclosure may comprise 5 to 70 wt % of the ionic liquid and 30 to 95 wt % of the aliphatic alcohol.

The phenolate-based anion according to the present disclosure may be a compound represented by the following Chemical Formula 1 or 2:

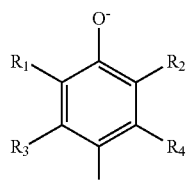

[Chemical Formula 1]

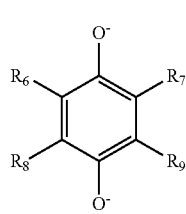

[Chemical Formula 2]

wherein $R_1$ to $R_9$ are independently of one another hydrogen, amino, carboxamido, C1-C10 alkyl, C1-C10 alkylcarbonyl, C1-C10 alkoxy, or C3-C8 cycloalkyl; and the amino, carboxamido, alkyl, alkylcarbonyl, alkoxy, and cycloalkyl may be substituted by one or two or more substituents selected from halogen, cyano, amino, nitro, C1-C10 alkyl, C1-C10 alkylcarbonyl, C1-C10 alkoxy, and C3-C8 cycloalkyl.

In some embodiments, $R_1$ to $R_9$ may be independently of one another hydrogen, amino, carboxamido, C1-C5 alkyl, C1-C5 alkylcarbonyl, or C1-C5 alkoxy, and the amino, carboxamido, alkyl, alkylcarbonyl, and alkoxy may be substituted by one or two or more substituents selected from halogen, cyano, amino, nitro, C1-C10 alkyl, C1-C10 alkylcarbonyl, C1-C10 alkoxy, and C3-C8 cycloalkyl.

In some embodiments, $R_1$ to $R_9$ may be independently of one another hydrogen, amino, or carboxamido, but at least one of them is amino or carboxamido, and the amino or carboxamido may be substituted by C1-C3 alkylcarbonyl.

The aliphatic alcohol according to an exemplary embodiment of the present disclosure may be an aliphatic monohydric alcohol or an aliphatic polyhydric alcohol, or C2-C10 aliphatic alcohol, and may have a boiling point of 120° C. or higher at 1 atm.

In some embodiments, the aliphatic alcohol may have a heat capacity of 4.0 KJ/kg·K or less.

The carbon dioxide absorbent according to an exemplary embodiment of the present disclosure may have a carbon dioxide absorption equivalent represented by the following Equation 1 of 0.7 or more:

Carbon dioxide absorption equivalent=(number of moles of absorbed carbon dioxide)/(number of moles of absorbent)     [Equation 1]

In another general aspect, a method of separating carbon dioxide using the carbon dioxide absorbent described above comprises: a first step of bringing a carbon dioxide absorbent into contact with a mixture comprising carbon dioxide; and a second step of heat treating the carbon dioxide absorbent to desorb the carbon dioxide attached to the absorbent.

The first step of the method of separating carbon dioxide may be performed under the condition of 20° C. to 80° C. and the second step may be performed for 30 to 250 minutes under the conditions of 70° C. to 150° C., and when the first and second steps are a unit process, the unit process may be repeated twice or more to continuously separate carbon dioxide.

In another general aspect, a method of capturing carbon dioxide is provided, the method comprising contacting carbon dioxide with a carbon dioxide absorbent comprising: an ionic liquid comprising a choline-based cation; and an aliphatic alcohol.

In another general aspect, a method of reducing greenhouse gas emissions comprising carbon dioxide, comprising: contacting the greenhouse gas emissions with a carbon dioxide absorbent comprising: an ionic liquid comprising a choline-based cation; and an aliphatic alcohol whereby the carbon dioxide absorbent captures carbon dioxide from the greenhouse gas emissions.

Advantageous Effects

Since the carbon dioxide absorbent according to the present disclosure is thermally and chemically stable, it may decrease atmospheric release of decomposition products when applied to a process, since the carbon dioxide absorbent may desorb carbon dioxide with low renewable energy, it is very economical, and since the carbon dioxide absorbent does not cause production of solid after absorbing carbon dioxide and controls a viscosity increase, it may be easily industrially applicable.

DESCRIPTION OF THE INVENTION

Hereinafter, the carbon dioxide absorbent of the present disclosure comprising an ionic liquid comprising a choline-based cation and a phenolate-based anion; and an aliphatic alcohol, a method of separating carbon dioxide using the same, a method of capturing carbon dioxide using the same, and a method of reducing greenhouse gas emissions comprising carbon dioxide will be described in detail.

The singular form used in the present disclosure may be intended to also include a plural form, unless otherwise indicated in the context.

The term "comprise" described in the present disclosure is an open-ended description having a meaning equivalent to the term such as "is/are provided", "contain", "have", or "is/are characterized", and does not exclude elements, materials or processes which are not further listed.

The term "alkyl" described in the present disclosure comprises a linear chain form and/or a branched chain form, and may have 1 to 20 carbon atoms, and preferably 1 to 10 carbon atoms.

The terms "halogen" and "halo" described in the present disclosure refer to fluorine, chlorine, bromine, or iodine.

The term "alkoxy" described in the present disclosure refers to —O-(alkyl) comprising —OCH₃, —OCH₂CH₃, —O(CH$_2$)$_2$CH$_3$, —O(CH$_2$)$_3$CH$_3$, —O(CH$_2$)$_4$CH$_3$, —O(CH$_2$)$_5$CH$_3$ and the like, in which alkyl is as defined above.

The term "alkylcarbonyl" described in the present disclosure may refer to —(C(═O)-alkyl), in which alkyl is as defined above. In addition, "C1-10 alkylcarbonyl" may refer to carbonyl containing C1-10 alkyl, that is, —(C(═O)—C1-10 alkyl), and as an example, may comprise methylcarbonyl (acetyl, —(C(═O)CH$_3$)), ethylcarbonyl, n-propylcarbonyl, iso-propylcarbonyl, n-butylcarbonyl, sec-butylcarbonyl, isobutylcarbonyl, tert-butylcarbonyl, n-octylcarbonyl, cyclopropylcarbonyl, cyclobutylcarbonyl, cyclopentylcarbonyl, or cyclohexylcarbonyl, and the like, but is not limited thereto.

"Nitro" described in the present disclosure refers to —NO$_2$, "cyano" refers to —CN, "amino" refers to —NR$_2$, and "carboxamido" refers to —(C(═O)NR$_2$), wherein R is hydrogen or hydrocarbyl.

The present disclosure provides a carbon dioxide absorbent comprising: an ionic liquid comprising a choline-based cation and a phenolate-based anion; and an aliphatic alcohol. Since the carbon dioxide absorbent of the present disclosure is thermally and chemically stable, it may decrease atmospheric release of decomposition products when applied to a process, since the carbon dioxide absorbent may desorb carbon dioxide with low renewable energy, it is very economical, and/or since the carbon dioxide absorbent does not cause production of solid after absorbing carbon dioxide and controls a viscosity increase, it may be easily industrially applicable.

The carbon dioxide absorbent according to an exemplary embodiment of the present disclosure may comprise 5 to 70 wt % of the ionic liquid and 30 to 95 wt % of the aliphatic alcohol, and preferably 10 to 50 wt % of the ionic liquid and 50 to 90 wt % of the aliphatic alcohol.

The phenolate-based anion according to the present disclosure may be a compound represented by the following Chemical Formula 1 or 2:

[Chemical Formula 1]

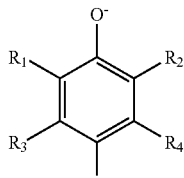

[Chemical Formula 2]

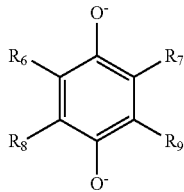

wherein

R$_1$ to R$_9$ are independently of one another hydrogen, amino, carboxamido, C1-C10 alkyl, C1-C10 alkylcarbonyl, C1-C10 alkoxy, or C3-C8 cycloalkyl; and the amino, carboxamido, alkyl, alkylcarbonyl, alkoxy, and cycloalkyl may be substituted by one or two or more substituents selected from halogen, cyano, amino, nitro, C1-C10 alkyl, C1-C10 alkylcarbonyl, C1-C10 alkoxy, and C3-C8 cycloalkyl.

Specifically, R$_1$ to R$_9$ may be independently of one another hydrogen, amino, carboxamido, C1-C5 alkyl, C1-C5 alkylcarbonyl, or C1-C5 alkoxy, and the amino, carboxamido, alkyl, alkylcarbonyl, and alkoxy may be substituted by one or two or more substituents selected from halogen, cyano, amino, nitro, C1-C10 alkyl, C1-C10 alkylcarbonyl, C1-C10 alkoxy, and C3-C8 cycloalkyl.

In some embodiments, R$_1$ to R$_9$ may be independently of one another hydrogen, amino, carboxamido, or C1-C3 alkyl, and the amino, carboxamido, and alkyl may be substituted by one or two or more substituents selected from C1-C5 alkyl, C1-C5 alkylcarbonyl, and C1-C5 alkoxy.

In some embodiments, R$_1$ to R$_9$ may be independently of one another hydrogen, amino, or carboxamido, but at least one of them is amino or carboxamido, and the amino or carboxamido may be substituted by C1-C3 alkylcarbonyl.

The phenolate-based anion according to the present disclosure may be a compound represented by the following Chemical Formula 3 or 4:

[Chemical Formula 3]

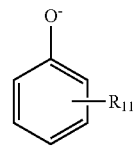

[Chemical Formula 4]

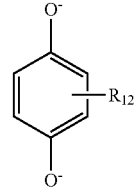

wherein

R$_{11}$ and R$_{12}$ are independently of each other —NH$_2$ or —NHCOCH$_3$.

The aliphatic alcohol according to an exemplary embodiment of the present disclosure may be an aliphatic monohydric alcohol or an aliphatic polyhydric alcohol, and in some embodiments, the aliphatic polyhydric alcohol may have 2 to 6, or 2 to 4 hydroxyl groups.

The aliphatic alcohol according to an exemplary embodiment of the present disclosure may be a C2-C10 aliphatic alcohol, and for example, may be a saturated aliphatic alcohol, an unsaturated aliphatic alcohol, or an alcohol containing a cyclic structure. It may be a C2-C10 straight chain alcohol or a branched chain alcohol.

Specifically, the C2-C10 aliphatic alcohol may be one or two more selected from 2-ethylhexanol, 2-methyl-1,3-propanediol, 1,3-propanediol, 2,2-dimethyl-1,3-propanediol, 1,4-butanediol, 1,3-butanediol, 1,2-butanediol, 2,3-butanediol, pinacol, ethylene glycol, propylene glycol, diethylene glycol, dipropylene glycol, triethylene glycol, tetraethyleneglycol, 3-methoxy-3-methyl-1-butanol, 3-methoxy-1-butanol, 1-methoxy-2-butanol, diethyleneglycol monoethylether, n-propyl alcohol, isopropyl alcohol, 1-butanol, 2-butanol, isobutyl alcohol, t-butyl alcohol, 2-pantanol, t-pentyl alcohol, 1-hexanol, allyl alcohol, propargyl alcohol, 2-butenyl alcohol, and 3-butenyl alcohol, but is not limited thereto.

The aliphatic alcohol may have a boiling point of 120° C. or higher, or 140° to 250° C., or 160° C. to 230° C. at 1 atm. Since water which is conventionally used as a solvent of a carbon dioxide absorbent has a low boiling point of 100° C. or lower, the decomposition product is highly likely to be released into the atmosphere. However, since the aliphatic alcohol solvent according to an exemplary embodiment of the present disclosure has a very high boiling point, it is unlikely to be released into the atmosphere, and it is chemically stable, so that a possibility to release the decomposition product into the atmosphere may be significantly lowered.

In some embodiments, the aliphatic alcohol may have a heat capacity of 4.0 KJ/kg·K or less. The heat capacity is not necessarily limited to the range, and may be 3.5 KJ/kg. K or less, 3.0 kJ/kg·K or less, 2.8 KJ/kg·K or less, or 2.5 KJ/kg·K or less. An amine-based absorbent which is conventionally used as a carbon dioxide absorbent (for example, mono-ethanolamine (MEA)) is used as a 30 wt % aqueous solution, and due to the high heat capacity of water used as the solvent (4.2 KJ/kg. K), high renewable energy is needed in the desorption process. Besides, since the amine-based absorbent is easily thermally decomposed or oxidatively decomposed by heat or oxygen, an environmental problem due to the release of the decomposition product into the atmosphere arises. However, the carbon dioxide absorbent according to an exemplary embodiment of the present disclosure uses an ionic liquid comprising a choline-based cation and a phenolate-based anion with an alcohol solvent, thereby lowering the heat capacity and significantly improving the renewable energy of the absorbent as compared with the conventional absorbent.

The cation material of the ionic liquid comprised in the carbon dioxide absorbent according to an exemplary embodiment of the present disclosure is a choline-based cation material, and may be represented by the following Chemical Formula 5:

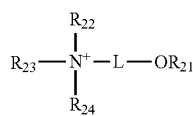

[Chemical Formula 5]

wherein

L is C2-C10 alkylene;

$R_{21}$ is hydrogen, C1-C20 alkyl, or C1-C20 alkylcarbonyl; and $R_{22}$ to $R_{24}$ are independently of one another C1-C4 alkyl.

In some embodiments, in Chemical Formula 5, L is C2-C6 alkylene, $R_{21}$ is hydrogen, C1-C10 alkyl, or C1-C10 alkylcarbonyl, and $R_{22}$ to $R_{24}$ are independently of one another C1-C3 alkyl.

In some embodiments, in Chemical Formula 5, L is C2-C4 alkylene, $R_{21}$ is hydrogen, C1-C5 alkyl, or C1-C5 alkylcarbonyl, and $R_{22}$ to $R_{24}$ are independently of one another C1-C2 alkyl.

In an exemplary embodiment of the present disclosure, the choline-based cation may be choline, acetylcholine, propionylcholine, or butyrylcholine, and preferably, choline, but is not limited thereto.

The carbon dioxide absorbent according to an exemplary embodiment of the present disclosure may have a carbon dioxide absorption equivalent represented by the following Equation 1 of 0.7 or more, preferably 0.72 to 1.5, and more preferably 0.75 to 1.5:

Carbon dioxide absorption equivalent=(number of moles of absorbed carbon dioxide)/(number of moles of ionic liquid). [Equation 1]

The carbon dioxide absorbent according to an exemplary embodiment of the present disclosure may show high carbon dioxide absorption performance as compared with conventional technology, since carbon dioxide may react with the phenolate-based anion of the carbon dioxide absorbent to form a carbamate (Reaction Formula 1), and simultaneously, may react with an alcohol to form a carbonate (Reaction Formula 2):

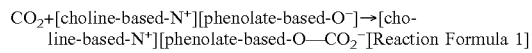

[Reaction Formula 1]

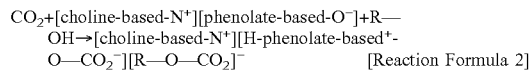

[Reaction Formula 2]

wherein

R is C2-C10 aliphatic hydrocarbyl.

Also, the present disclosure provides a method of separating carbon dioxide using the carbon dioxide absorbent according to an exemplary embodiment of the present disclosure, and the method of separating carbon dioxide according to the present disclosure may comprise: a first step of bringing a carbon dioxide absorbent into contact with a mixture comprising carbon dioxide; and a second step of heat treating the carbon dioxide absorbent to desorb the carbon dioxide attached to the absorbent.

The first step of the method of separating carbon dioxide may be performed under the condition of 20° C. to 80° C., or 25° C. to 65° C., or 30° C. to 50° C., but is not limited thereto.

In addition, the first step of the method of separating carbon dioxide may be performed at 0.1 bar to 2.0 bar, or 0.3 bar to 1.7 bar, or 0.6 bar to 1.4 bar, but is not limited thereto.

The second step of the method of separating carbon dioxide may be performed for 30 to 250 minutes under the condition of 70° C. to 150° C., or for 40 to 200 minutes under the condition of 80° C. to 130° C., or for 60 to 180 minutes under the condition of 90° C. to 110° C., but is not limited thereto.

The second step of the method of separating carbon dioxide may be performed under the $N_2$ flow condition of 100 cc/min to 300 cc/min, or under the $N_2$ flow conditions of 150 cc/min to 250 cc/min, or under the $N_2$ flow condition of 180 cc/min to 220 cc/min, but is not limited thereto.

The method of separating carbon dioxide according to an exemplary embodiment of the present disclosure may be a method in which the first step and the second step are a unit process, and the unit process may be repeated twice or more to continuously separate carbon dioxide.

The second step of the method of separating carbon dioxide according to an exemplary embodiment allows desorption within a short time at a low temperature as compared with the amine-based absorbent used as a conventional absorbent (for example, MEA).

That is, the carbon dioxide absorbent according to the present disclosure uses an alcohol solvent, thereby lowering a heat capacity and producing both carbamate and carbonate simultaneously to significantly lower renewable energy as compared with the conventional absorbent, and thus, having very high carbon dioxide desorption efficiency.

The method of separating carbon dioxide according to an exemplary embodiment of the present disclosure significantly improves viscosity after carbon dioxide absorption as compared with the viscosity before carbon dioxide absorption, thereby significantly improving the absorption and desorption of carbon dioxide. When carbamate or carbonate is produced using a conventional carbon dioxide absorbent, the viscosity of a reaction solution is increased to lower continuous carbon dioxide absorption reaction efficiency, and a high temperature condition for a long time is needed when carbon dioxide is desorbed again after absorbing carbon dioxide. Since the carbon dioxide absorbent according to an exemplary embodiment of the present disclosure has rather lowered viscosity after capturing, it is much more effective for absorption and desorption of carbon dioxide.

The method of capturing carbon dioxide comprises contacting carbon dioxide with a carbon dioxide absorbent comprising: an ionic liquid comprising a choline-based cation; and an aliphatic alcohol in a manner as disclosed herein.

In another general aspect, a method of reducing greenhouse gas emissions comprising carbon dioxide, comprising: contacting the greenhouse gas emissions with a carbon dioxide absorbent comprising: an ionic liquid comprising a choline-based cation; and an aliphatic alcohol in a manner as disclosed herein whereby the carbon dioxide absorbent captures carbon dioxide from the greenhouse gas emissions.

Hereinafter, the carbon dioxide absorbent comprising the ionic liquid comprising the choline-based cation and the phenolate-based anion, and the aliphatic alcohol, and the method of separating carbon dioxide using the same will be described in more detail through the specific examples.

EXAMPLES

[Preparation Example 1] Preparation of Ionic Liquid-1

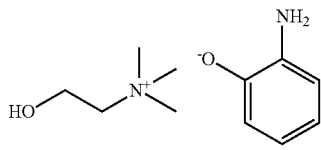

10.00 g (46 wt %, 38.0 mmol) of a choline hydroxide aqueous solution (TCI, C0326) and 4.15 g (38.0 mmol) of 2-aminophenol (Sigma-Aldrich, A71301) were added to 100 mL of RBF, and then stirring was performed at room temperature for 2 hours. The reactant was dried under vacuum at 60° C. for 15 hours to obtain 7.58 g (94%) of a dark brown oil.

1H NMR (500 MHZ), $D_2O$, 25° C.: δ=6.79 (m, 1H), 6.71 (m, 1H), 6.61 (m, 1H), 6.50 (m, 1H), 4.02 (m, 2H), 3.46 (m, 2H), 3.15 (s, 9H).

[Preparation Example 2] Preparation of Ionic Liquid-2

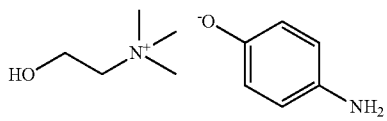

10.00 g (46 wt %, 38.0 mmol) of a choline hydroxide aqueous solution and 4.15 g (38.0 mmol) of 4-aminophenol (Sigma-Aldrich, A71328) were added to 100 mL of RBF, and then stirring was performed at room temperature for 2 hours. The reactant was dried under vacuum at 60° C. for 15 hours to obtain 7.66 g (95%) of a dark brown solid.

1H NMR (500 MHZ), d-DMSO, 25° C.: δ=6.20 (d, 2H), 6.00 (d, 2H), 3.79 (m, 2H), 3.32 (m, 2H), 3.51 (br, 2H), 3.10 (s, 9H).

[Preparation Example 3] Preparation of Ionic Liquid-3

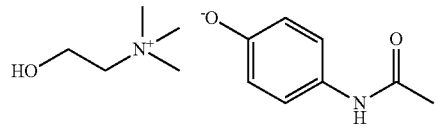

10.00 g (46 wt %, 38.0 mmol) of a choline hydroxide aqueous solution and 5.74 g (38.0 mmol) of 4-acetylaminophenol (Sigma-Aldrich, A7085) were added to 100 mL of RBF, and then stirring was performed at room temperature for 2 hours. The reactant was dried under vacuum at 60° C. for 15 hours to obtain 9.18 g (95%) of a dark brown oil.

1H NMR (500 MHZ), D2O, 25° C.: δ=7.04 (d, 2H), 6.58 (d, 2H), 4.03 (tr, 2H), 3.48 (tr, 2H), 3.17 (s, 9H), 2.10 (s, 3H).

[Comparative Preparation Example 1] Preparation of Ionic Liquid-4

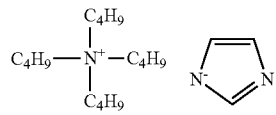

5.00 g (18.0 mmol) of tetrabutylammonium chloride (Sigma-Aldrich, 86870), 1.37 g (18.0 mmol) of sodium imidazolate (Sigma-Aldrich, 197637), and 20 mL of ethanol were added to 100 mL of RBF, and then stirring was performed at room temperature for 2 hours. The produced solid was filtered out of the reactant, and the filtrate was dried under vacuum at 50° C. for 15 hours to obtain 5.46 g (98%) of a light yellow oil.

1H NMR (500 MHZ), d-DMSO, 25° C.: δ=7.06 (s, 1H), 6.65 (s, 2H), 3.18 (tr, 8H), 1.58 (m, 8H), 1.33 (m, 8H), 0.94 (m, 12H).

[Comparative Preparation Example 2] Preparation of Ionic Liquid-5

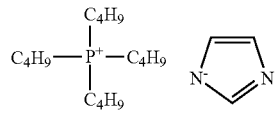

5.00 g (14.7 mmol) of tetrabutylphosphonium bromide (Sigma-Aldrich, 189138), 1.12 g (14.7 mmol) of sodium imidazolate, and 20 mL of ethanol were added to 100 mL of RBF, and then stirring was performed at room temperature for 2 hours. The produced solid was filtered out of the reactant, and then the filtrate was dried under vacuum at 50° C. for 15 hours to obtain 4.66 g (97%) of a light yellow oil.

1H NMR (500 MHZ), d-DMSO, 25° C.: δ=7.73 (s, 1H), 7.10 (s, 2H), 2.14 (m, 8H), 1.23 (m, 8H), 1.43 (m, 8H), 0.91 (m, 12H).

[Comparative Preparation Example 3] Preparation of Ionic Liquid-6

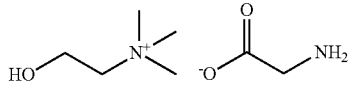

10.00 g (46 wt %, 38.0 mmol) of a choline hydroxide aqueous solution and 2.85 g (38.0 mmol) of glycine (Sigma-Aldrich, G7126) were added to 100 mL of RBF, and then stirring was performed at room temperature for 2 hours. The reactant was dried under vacuum at 60° C. for 15 hours to obtain 6.64 g (98%) of a transparent oil.

1H NMR (500 MHZ), d-DMSO, 25° C.: δ=3.85 (br, 2H), 3.41 (br, 2H), 3.12 (s, 9H), 2.68 (s, 2H), 1.23 (br, 2H).

[Comparative Preparation Example 4] Preparation of Ionic Liquid-7

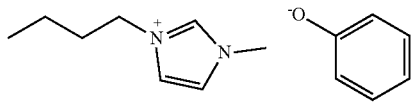

5.00 g (28.6 mmol) of 1-butyl-3-methylimidazolium chloride (Sigma-Aldrich, 94128), 3.33 g (28.6 mmol) of sodium phenoxide (Sigma-Aldrich, 318191), and 20 mL of ethanol were added to 100 mL of RBF, and then stirring was performed at room temperature for 2 hours. The produced solid was filtered out of the reactant, and then the filtrate was dried under vacuum at 50° C. for 15 hours to obtain 6.51 g (98%) of a dark brown oil.

1H NMR (500 MHZ), d-DMSO, 25° C.: δ=9.35 (br, 1H), 7.77 (s, 1H), 7.70 (s, 1H), 6.73 (br, 2H), 6.14 (br, 2H), 5.94 (br, 1H), 4.15 (m, 2H), 3.84 (s, 3H), 1.75 (m, 2H), 1.26 (m, 2H), 0.88 (m, 3H).

[Examples 1 to 5] Preparation of Carbon Dioxide Absorbent

As shown in Table 1 below, carbon dioxide absorbents according to Examples 1 to 5 containing 30 wt % of the ionic liquid with respect to the total carbon dioxide absorbent were prepared. When preparing the carbon dioxide absorbent, the ionic liquid and the solvent were added according to the weight ratio, regardless of the order of addition, and mixing was performed at 10° C. to 100° C. for 5 minutes to 60 minutes.

[Comparative Examples 1 to 4] Preparation of Carbon Dioxide Absorbent

As shown in Table 1 below, carbon dioxide absorbents according to Comparative Examples 1 to 4 containing 30 wt % of the ionic liquid with respect to the total carbon dioxide absorbent were prepared.

[Comparative Example 5] Preparation of Carbon Dioxide Absorbent

The carbon dioxide absorbent according to Comparative Example 5 including only the ionic liquid of Preparation Example 1 was prepared.

TABLE 1

| | Ionic liquid | Solvent |
|---|---|---|
| Example 1 | Preparation Example 1 | Monoethylene glycol |
| Example 2 | Preparation Example 1 | 2-ethylhexanol |
| Example 3 | Preparation Example 2 | Monoethylene glycol |
| Example 4 | Preparation Example 2 | 2-ethylhexanol |
| Example 5 | Preparation Example 3 | 2-ethylhexanol |
| Comparative Example 1 | Comparative Preparation Example 1 | 2-ethylhexanol |
| Comparative Example 2 | Comparative Preparation Example 2 | 2-ethylhexanol |
| Comparative Example 3 | Comparative Preparation Example 3 | 2-ethylhexanol |
| Comparative Example 4 | Preparation Example 4 | 2-ethylhexanol |
| Comparative Example 5 | Preparation Example 1 | — |

[Experimental Example 1] Evaluation of Carbon Dioxide Absorption Performance

In order to evaluate the carbon dioxide absorption performance of the carbon dioxide absorbents according to Examples 1 to 5 and Comparative Examples 1 to 5, the carbon dioxide absorption performance was measured using a vapor liquid equilibrium (VLE) apparatus manufactured according to a reference (Applied Chemistry for Engineering, 2010, 21 (3), 284-290). As the vapor liquid equilibrium apparatus, an apparatus including a cylinder for storing carbon dioxide (150 mL), constant temperature water bath, a stainless steel absorption reactor (73 mL) equipped with a thermometer, an electronic pressure gauge, and an agitator was used. At this time, absorption ability was measured, while a constant temperature in the cylinder and the reactor was maintained at 40° C. using a constant temperature water bath and a heating block, respectively. A measurement error range of the reactor was +0.1° C. and +0.01 bar.

Evaluation of carbon dioxide absorption performance was performed specifically by the following method. First, the inside of a cylinder for storing carbon dioxide and an absorption reactor was sufficiently replaced with nitrogen, and the cylinder for storing carbon dioxide was filled with carbon dioxide and maintained at 40° C. under 1 bar. Next, absorbent (6.0 g) solutions according to Examples 1 to 5 and Comparative Examples 1 to 5 were added into the absorption reactor, which was maintained at 40° C., a valve connecting the cylinder and the reactor was opened, and a pressure was measured after reaching absorption equilibrium. An equilibrium pressure was measured every 30 minutes, and the process was repeated until there was no change in pressure between the cylinder and the reactor. Next, an ideal gas equation was used to calculate the number of moles of captured carbon dioxide depending on pressure change. The carbon dioxide absorption equivalent calculated by the following Equation 1, the viscosity of the absorbent before and after absorption, and whether a solid was produced after absorption were analyzed, using the number of moles of absorbed carbon dioxide, and are shown in the following Table 2:

Carbon dioxide absorption equivalent=(number of moles of absorbed carbon dioxide)/(number of moles of absorbent)  [Equation 1]

TABLE 2

| | Carbon dioxide absorption equivalent ($CO_2$-mol/mol) | Whether solid was produced after absorption | Viscosity before absorption (mPa·s, 40°C.) | Viscosity after absorption (mPa·s, 40°C.) |
|---|---|---|---|---|
| Example 1 | 0.970 | x | 19.7 | 25.0 |
| Example 2 | 0.984 | x | 15.2 | 7.3 |
| Example 3 | 0.830 | x | 21.3 | 28.3 |
| Example 4 | 0.775 | x | 7.4 | 17.4 |
| Example 5 | 0.775 | x | 13.1 | 28.8 |
| Comparative Example 1 | 0.884 | ○ | 17.6 | Unanalyzable |
| Comparative Example 2 | 0.714 | x | 14.2 | 37.1 |
| Comparative Example 3 | 0.421 | ○ | 11.1 | Unanalyzable |
| Comparative Example 4 | 0.617 | x | 11.8 | 33.8 |
| Comparative Example 5 | Unanalyzable | Unanalyzable | 13,340 | Unanalyzable |

As shown in Table 2, the carbon dioxide absorption performance of the Examples was all 0.75 or more, which was excellent absorption performance, and in particular, Examples 1 and 2 showed very improved absorption performance of 0.95 or more.

However, Comparative Examples 2 to 4 showed absorption performance lower than the Examples, and in particular, Comparative Examples 1 and 3 were not able to be used repeatedly since a solid was produced after absorbing carbon dioxide.

In addition, Comparative Example 5 in which the aliphatic alcohol was excluded had a very high initial viscosity, and carbon dioxide absorption performance was not able to be evaluated.

The carbon dioxide absorbent comprising the aliphatic alcohol according to the Examples of the present disclosure had a low viscosity before absorption, controlled the viscosity to a level of 30 mPa·s or less after adsorbing carbon dioxide to complement the viscosity increase problem after adsorption of the ionic liquid carbon dioxide absorbent, did not cause formation of a solid after absorption to allow repeated use, and had an excellent carbon dioxide absorptive capacity. Therefore, the carbon dioxide absorbent according to the present disclosure is expected to be industrially very useful.

The invention claimed is:

1. A carbon dioxide absorbent comprising:
  an ionic liquid comprising a choline-based cation and a phenolate-based anion; and
  an aliphatic alcohol.

2. The carbon dioxide absorbent of claim 1, wherein the carbon dioxide absorbent comprises 5 to 70 wt % of the ionic liquid and 30 to 95 wt % of the aliphatic alcohol.

3. The carbon dioxide absorbent of claim 1, wherein the phenolate-based anion is a compound represented by the following Chemical Formula 1 or 2:

[Chemical Formula 1]

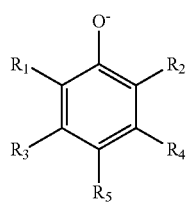

[Chemical Formula 2]

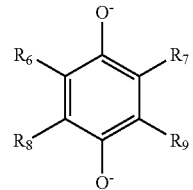

wherein
R$_1$ to R$_9$ are independently of one another hydrogen, amino, carboxamido, C1-C10 alkyl, C1-C10 alkylcarbonyl, C1-C10 alkoxy, or C3-C8 cycloalkyl; and
the amino, carboxamido, alkyl, alkylcarbonyl, alkoxy, and cycloalkyl may be substituted by one or two or more substituents selected from halogen, cyano, amino, nitro, C1-C10 alkyl, C1-C10 alkylcarbonyl, C1-C10 alkoxy, and C3-C8 cycloalkyl.

4. The carbon dioxide absorbent of claim 3,
wherein R$_1$ to R$_9$ are independently of one another hydrogen, amino, carboxamido, C1-C5 alkyl, C1-C5 alkylcarbonyl, or C1-C5 alkoxy; and
the amino, carboxamido, alkyl, alkylcarbonyl, and alkoxy may be substituted by one or two or more substituents selected from halogen, cyano, amino, nitro, C1-C10 alkyl, C1-C10 alkylcarbonyl, C1-C10 alkoxy, and C3-C8 cycloalkyl.

5. The carbon dioxide absorbent of claim 3,
wherein R$_1$ to R$_9$ are independently of one another hydrogen, amino, or carboxamido, but at least one of them is amino or carboxamido; and
the amino or carboxamido may be substituted by C1-C3 alkylcarbonyl.

6. The carbon dioxide absorbent of claim 1, wherein the aliphatic alcohol is an aliphatic monohydric alcohol or an aliphatic polyhydric alcohol.

7. The carbon dioxide absorbent of claim 1, wherein the aliphatic alcohol is C2-C10 aliphatic alcohol.

8. The carbon dioxide absorbent of claim 1, wherein the aliphatic alcohol has a boiling point of 120° C. or higher at 1 atm.

9. The carbon dioxide absorbent of claim 1, wherein the aliphatic alcohol has a heat capacity of 4.0 KJ/kg·K or less.

10. The carbon dioxide absorbent of claim 1, wherein a carbon dioxide absorption equivalent represented by the following Equation 1 is 0.7 or more:

Carbon dioxide absorption equivalent=(number of moles of absorbed carbon dioxide)/(number of moles of absorbent). [Equation 1]

11. A method of separating carbon dioxide, the method comprising:
  a first step of bringing the carbon dioxide absorbent of claim 1 into contact with a mixture comprising carbon dioxide; and
  a second step of heat treating the carbon dioxide absorbent to desorb the carbon dioxide attached to the absorbent.

12. The method of separating carbon dioxide of claim 11, wherein the first step is performed under a condition of 20° C. to 80° C.

13. The method of separating carbon dioxide of claim 11, wherein the second step is performed for 30 to 250 minutes under a condition of 70° C. to 150° C.

14. The method of separating carbon dioxide of claim 11, wherein the first step and the second step are a unit process, and the unit process is repeated twice or more to continuously separate carbon dioxide.

15. The carbon dioxide absorbent of claim 1, wherein the choline-based cation is represented by the following Chemical Formula 5:

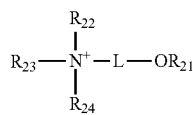

[Chemical Formula 5]

wherein

L is C2-C10 alkylene;

$R_{21}$ is hydrogen, C1-C20 alkyl, or C1-C20 alkylcarbonyl; and $R_{22}$ to $R_{24}$ are independently of one another C1-C4 alkyl.

16. The carbon dioxide absorbent of claim 15, wherein L is C2-C6 alkylene, $R_{21}$ is hydrogen, C1-C10 alkyl, or C1-C10 alkylcarbonyl, and $R_{22}$ to $R_{24}$ are independently of one another C1-C3 alkyl.

17. The carbon dioxide absorbent of claim 15, wherein L is C2-C4 alkylene, $R_{21}$ is hydrogen, C1-C5 alkyl, or C1-C5 alkylcarbonyl, and $R_{22}$ to $R_{24}$ are independently of one another C1-C2 alkyl.

18. The carbon dioxide absorbent of claim 1, wherein the choline-based cation is choline, acetylcholine, propionylcholine, or butyrylcholine.

19. A method of capturing carbon dioxide, comprising contacting carbon dioxide with a carbon dioxide absorbent comprising:

an ionic liquid comprising a choline-based cation; and an aliphatic alcohol.

20. A method of reducing greenhouse gas emissions comprising carbon dioxide, comprising:

contacting the greenhouse gas emissions with a carbon dioxide absorbent comprising:

an ionic liquid comprising a choline-based cation; and an aliphatic alcohol whereby the carbon dioxide absorbent captures carbon dioxide from the greenhouse gas emissions.

* * * * *

UNITED STATES PATENT AND TRADEMARK OFFICE
CERTIFICATE OF CORRECTION

| | | |
|---|---|---|
| PATENT NO. | : 12,257,566 B2 | Page 1 of 1 |
| APPLICATION NO. | : 18/257524 | |
| DATED | : March 25, 2025 | |
| INVENTOR(S) | : Lim Ok Pyun et al | |

It is certified that error appears in the above-identified patent and that said Letters Patent is hereby corrected as shown below:

On the Title Page

Column 2, Item (56) Other Publications, Line 4, delete "Ionic" and insert -- Ionic --

In the Claims

Column 14, Line 45, Claim 9, delete "KJ/kg·K" and insert -- kJ/kg·K --

Signed and Sealed this
Seventeenth Day of June, 2025

Coke Morgan Stewart
*Acting Director of the United States Patent and Trademark Office*